United States Patent
Oishi

(10) Patent No.: US 11,770,142 B2
(45) Date of Patent: Sep. 26, 2023

(54) WIRELESS COMMUNICATION APPARATUS

(71) Applicant: FUJITSU LIMITED, Kawasaki (JP)

(72) Inventor: Kazuaki Oishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 17/500,996

(22) Filed: Oct. 14, 2021

(65) Prior Publication Data

US 2022/0231713 A1 Jul. 21, 2022

(30) Foreign Application Priority Data

Jan. 21, 2021 (JP) .................. 2021-008081

(51) Int. Cl.
*H04B 1/04* (2006.01)
*H01Q 21/06* (2006.01)

(52) U.S. Cl.
CPC ......... *H04B 1/0475* (2013.01); *H01Q 21/065* (2013.01); *H04B 2001/0416* (2013.01)

(58) Field of Classification Search
None
See application file for complete search history.

(56) References Cited

U.S. PATENT DOCUMENTS

| | | | | |
|---|---|---|---|---|
| 7,639,076 B2 * | 12/2009 | Moon | ................... | H03F 3/211 330/144 |
| 10,468,781 B1 * | 11/2019 | Paulsen | ................... | H01Q 3/26 |
| 10,971,815 B1 * | 4/2021 | West | ................... | H01Q 21/24 |
| 2019/0253126 A1 * | 8/2019 | Paramesh | ............ | H04B 1/0078 |
| 2020/0091608 A1 | 3/2020 | Alpman et al. | | |
| 2020/0153476 A1 * | 5/2020 | Burke | ................... | H04B 7/0617 |
| 2022/0279458 A1 * | 9/2022 | Shimizu | ................. | H04L 5/006 |

FOREIGN PATENT DOCUMENTS

| | | |
|---|---|---|
| JP | 2016-090432 A | 5/2016 |
| JP | 2020-507230 A | 3/2020 |
| WO | 2018/119153 A2 | 6/2018 |

* cited by examiner

*Primary Examiner* — Pablo N Tran

(74) *Attorney, Agent, or Firm* — Fujitsu Patent Center

(57) ABSTRACT

A wireless communication apparatus includes a signal terminal which receives a transmitting signal, N antenna elements, where N is an integer greater than or equal to 2, a first amplifier including first input and output terminals, and N second amplifiers including N second input and output terminals coupled to the N antenna elements, respectively. The first amplifier amplifies the transmitting signal received from the signal terminal via the first input terminal with a gain which is weighted and adjustable according to a first weight. The N second amplifiers amplify the amplified transmitting signal received from the second output terminal via the N second input terminals with gains which are weighted and adjustable according to N second weights. The amplified transmitting signal, amplified by the N second amplifiers, is output to the N antenna elements via the N second output terminals.

13 Claims, 5 Drawing Sheets

WIRELESS COMMUNICATION APPARATUS

CROSS-REFERENCE TO RELATED APPLICATIONS

This application is based upon and claims the benefit of priority of the prior Japanese Patent Application No. 2021-008081, filed on Jan. 21, 2021, the entire contents of which are incorporated herein by reference.

FIELD

The embodiments discussed herein are related to wireless communication apparatuses.

BACKGROUND

Conventionally, there is a radio frequency (RF) transmitter which includes a mixer, a first amplifier connected to an output of the mixer, a plurality of phase shifters connected to an output of the first amplifier, and a plurality of second amplifiers connected to respective outputs of the plurality of phase shifters. This RF transmitter transmits signals amplified by the plurality of second amplifiers, via a phased antenna array (or array antenna). An example of such an RF transmitter is proposed in Japanese National Publication of International Patent Application No. 2020-507230, for example.

However, in the RF transmitter illustrated in FIG. 26 of Japanese National Publication of International Patent Application No. 2020-507230, for example, the first amplifier and the plurality of second amplifiers are not configured to variably control the gain. On the other hand, if a plurality of first variable gain amplifiers and a plurality of second variable gain amplifiers were connected in series, a circuit scale would become large.

SUMMARY

Accordingly, one aspect of the embodiments provides a wireless communication apparatus which can reduce the circuit scale thereof.

According to one aspect of the embodiments, a wireless communication apparatus includes a signal terminal configured to receive a transmitting signal; N antenna elements, where N is an integer greater than or equal to 2; a first variable amplifier including a first input terminal coupled to the signal terminal, and a first output terminal; and N second variable amplifiers including N second input terminals coupled to the first input terminal, and N second output terminals coupled to the N antenna elements, respectively, wherein the first variable amplifier is configured to amplify the transmitting signal received from the signal terminal via the first input terminal with a gain which is weighted and adjustable according to a first weight, and output the amplified transmitting signal via the first output terminal, and wherein the N second variable amplifiers are configured to amplify the amplified transmitting signal received from the first output terminal via the N second input terminals with gains which are weighted and adjustable according to N second weights, and output the amplified transmitting signal, which is amplified by the N second variable amplifiers, to the N antenna elements via the N second output terminals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

A description will now be given of the wireless communication apparatus according to each embodiment of the present invention.

Figure 1:
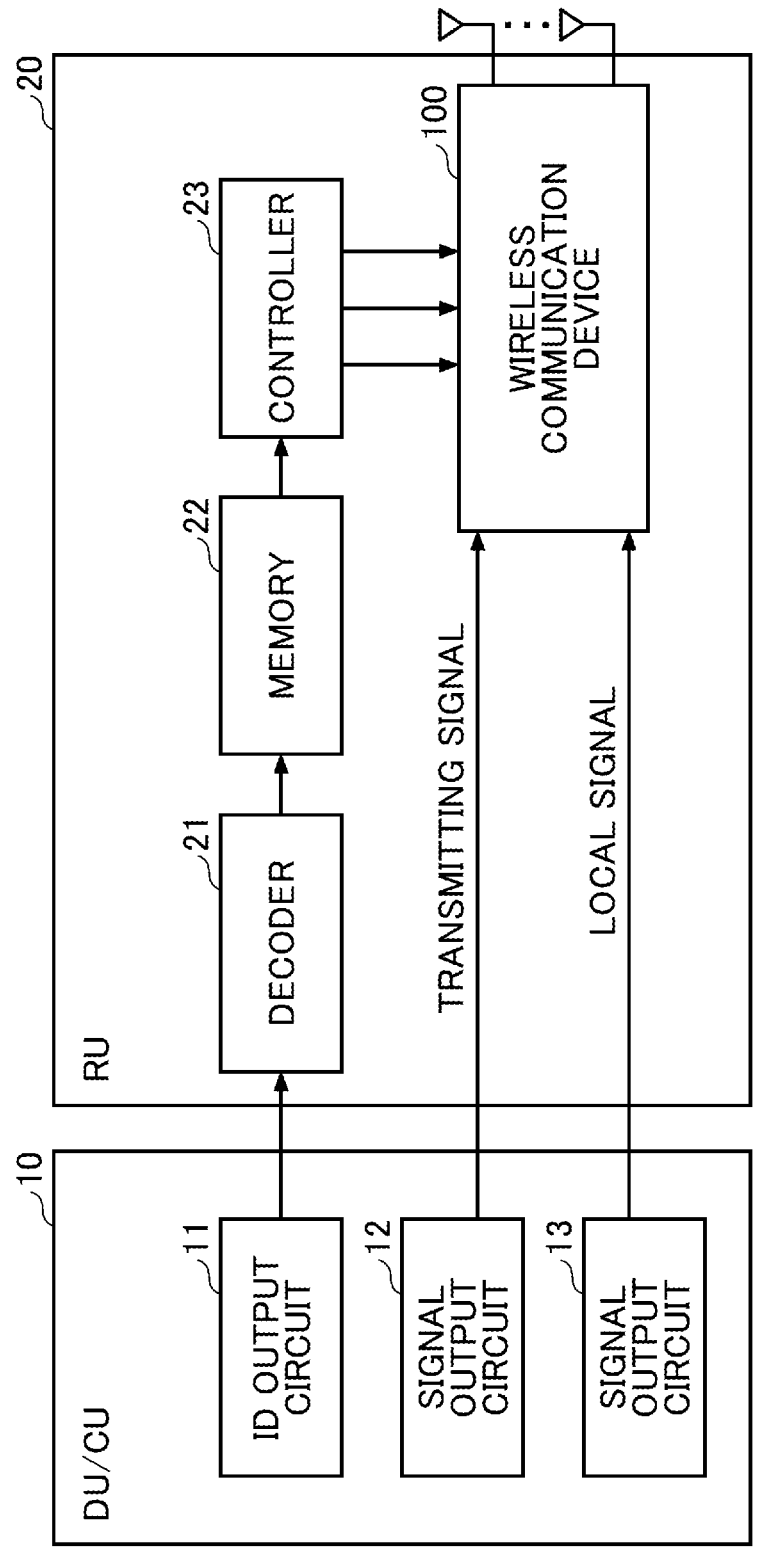
FIG. 1 is a block diagram illustrating a base station, and a radio unit including a wireless communication apparatus according to one embodiment.

FIG. 1 is a block diagram illustrating a base station 10, and a radio unit (RU) 20 including a wireless communication apparatus 100 according to one embodiment. The base station 10 is formed by a distributed unit (DU), and a central unit (CU). The base station 10 includes an ID output circuit 11, and signal output circuits 12 and 13. The base station 10 includes components other than the ID output circuit 11 and the signal output circuits 12 and 13, however, illustration of such other components will be omitted.

The ID output circuit 11 outputs an ID number to a decoder 21 of the RU 20. The ID number output from the ID output circuit 11 includes multiple kinds of ID numbers. Each kind of ID number is allocated to information related to a direction of a beam output from an array antenna of the wireless communication apparatus 100. The signal output circuit 12 outputs a transmitting signal to the wireless communication apparatus 100 of the RU 20. The signal output circuit 13 outputs a local signal to the wireless communication apparatus 100 of the RU 20.

The RU 20 includes the decoder 21, a memory 22, a controller 23, and the wireless communication apparatus 100. The decoder 21 decodes the ID number input from the ID output circuit 11 to acquire an address, and supplies the address to the memory 22. The memory 22 includes a memory controller, and reads control data therefrom based on the address input from the decoder 21, and supplies the read control data to the controller 23. The control data includes gain weighting data for weighting a gain when amplifying the transmitting signal in the wireless communication apparatus 100, and phase weighting data for weighting a phase when shifting the phase of the transmitting signal.

The controller 23 controls an amplification and a phase shift of the transmitting signal input to the wireless communication apparatus 100, using the gain weighting data and the phase weighting data input from the memory 22. The controller 23 may be formed by an integrated circuit (IC), for example.

The base station 10 and the RU 20 are devices for data communication in conformance with the fifth generation mobile communication system (5G), for example. The wireless communication apparatus 100 of the RU 20 can simultaneously output a plurality of beams by beam forming. Details of the beam forming will be described later.

Figure 2:
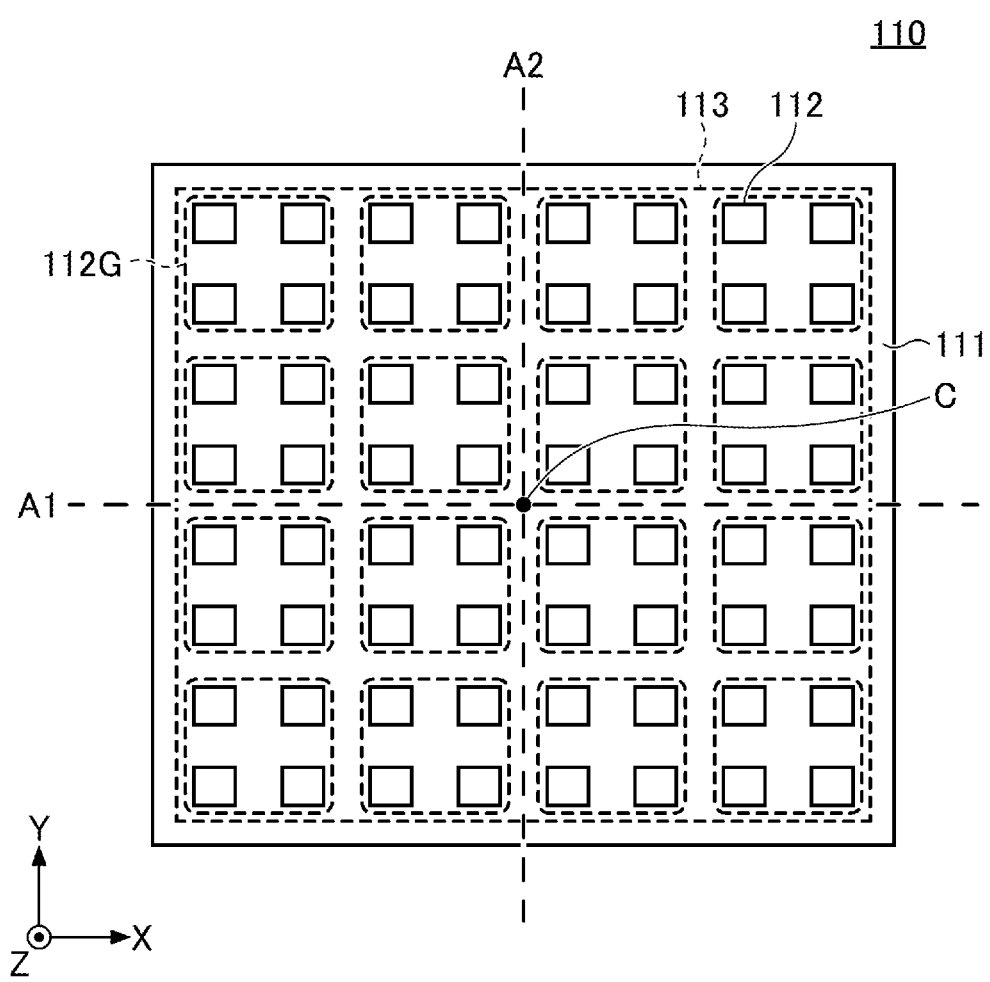
FIG. 2 is a diagram illustrating an array antenna of the wireless communication apparatus.

FIG. 2 is a diagram illustrating an array antenna 110 of the wireless communication apparatus 100. The XYZ coordinate system will be defined as follows in the following description. In addition, a plan view refers to a view of an XY plane. For the sake of convenience, a −Z direction may also be referred to as a direction toward a bottom or a downward direction, and a +Z direction may also be referred to as a direction toward a top or an upward direction, however, such a directional relationship does not represent a universal up-and-down (or vertical) relationship.

The array antenna 110 includes a substrate 111, antenna elements 112, and a ground layer 113. A communication frequency of the array antenna 110 may be in a 3.7 GHz band, a 4.5 GHz band, or a 28 GHz band, for example.

The substrate 111 may be a wiring board in conformance with the flame retardant type 4 (FR4) standard, for example. The antenna elements 112 are provided on a top surface of the substrate 111, and the ground layer 113 is provided on a bottom surface. The antenna elements 112 are arranged in an array on the top surface of the substrate 111, and for example, 64 antenna elements 112, made up of an array of 8×8 antenna elements 112, are arranged at a constant pitch in both the X direction and the Y direction. The array of the antenna elements 112 may also be treated as a matrix. The antenna element 112 has a square shape in the plan view, and a length of one side of the square is set to approximately ½ an electrical length in wavelengths at the communication frequency. Because the ground layer 113 is provided on the bottom surface of the substrate 111 which has the antenna elements 112 provided on the top surface thereof, and all of the antenna elements 112 overlap the ground layer 113 in the plan view, the antenna elements 112 and the ground layer 113 form a patch antenna (or microstrip antenna).

Power is supplied to each antenna element 112 via a through hole and a wiring (or interconnect) of the substrate 111. Gains and phases of radio waves emitted from the plurality of antenna elements 112 are adjusted to form a single beam.

In this example, 64 antenna elements 112 are divided into 16 groups 112G. Each group 112G includes 4 antenna elements 112 made up of an array of 2×2 antenna elements 112. In each group 112G, the 4 antenna elements 112 are arranged adjacent to each other in the plan view. The antenna elements 112, which are adjacent to each other in the plan view, are arranged in close proximity to each other in the plan view. The 4 antenna elements 112 included in one group 112G are examples of N antenna elements 112, where N is a positive integer, and N=4 in this example.

Straight lines A1 and A2 will be defined. In the plan view, the straight line A1 passes through a center C of the 64 antenna elements 112, and is parallel to the X-axis. In the plan view, the straight line A2 passes through the center C of the 64 antenna elements 112, and is parallel to the Y-axis. In the plan view, the 16 groups 112G are arranged in line symmetry with respect to an axis of symmetry formed by the straight line A1. Further, in the plan view, the 16 groups 112G are arranged in line symmetry with respect to an axis of symmetry formed by the straight line A2. Accordingly, the 16 groups 112G are arranged symmetrically in the plan view. Moreover, the 64 antenna elements 112 are arranged in line symmetry with respect to the axis of symmetry formed by the straight line A1, and are arranged in line symmetry with respect to the axis of symmetry formed by the straight line A2.

Although one group 112G includes the 4 antenna elements 112 made up of the array of 2×2 antenna elements 112 in this example, the arrangement of the plurality of antenna elements 112 included in one group 112G is not limited to such an arrangement, as will be described later in more detail. Further, the array antenna 110 is not limited to the configuration illustrated in FIG. 2, and may have a configuration different from that illustrated in FIG. 2, as long as the plurality of antenna elements 112 are arranged in an array.

Figure 3C:
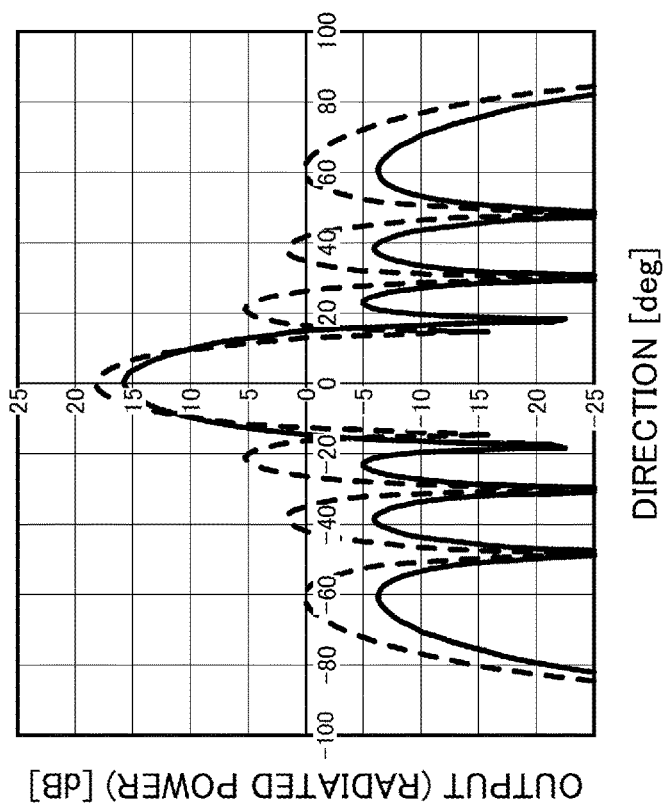
FIG. 3A, FIG. 3B, and FIG. 3C are diagrams for explaining a Chebyshev weighting.
Figure 3A:
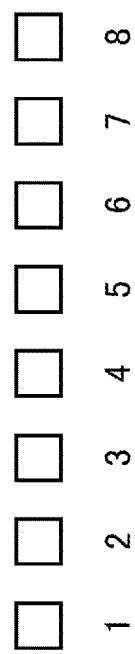
Figure 3B:
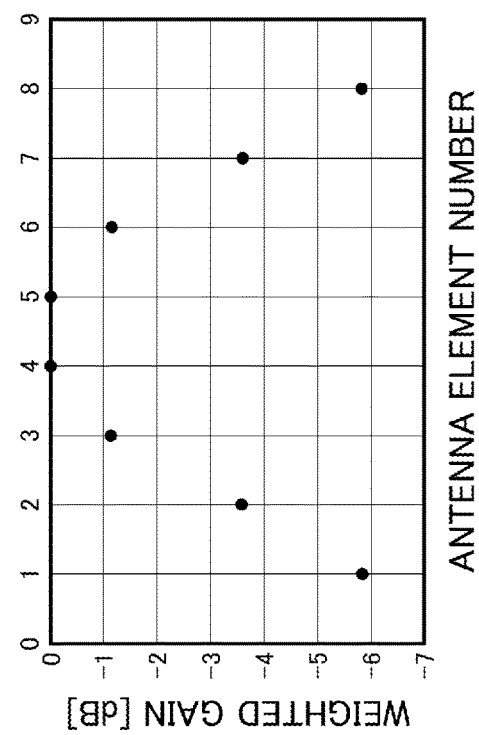

Next, a reduction of a side lobe by a Chebyshev weighting will be described, with reference to FIG. 3A, FIG. 3B, and FIG. 3C. FIG. 3A through FIG. 3C are diagrams for explaining the Chebyshev weighting. For the sake of convenience, it is assumed that 8 antenna elements are arranged linearly as illustrated in FIG. 3A, and antenna elements numbers 1 to 8 are allocated to the antenna elements from the leftmost antenna element to the rightmost antenna element in the linear arrangement.

It is also assumed that 8 variable amplifiers are connected to the 8 antenna elements, respectively, and the gain is weighted when amplifying the power radiated from the 8 antenna elements.

In FIG. 3B, an abscissa indicates the antenna element number, and the ordinate indicates the weighted gain. The gain of the power radiated from the 8 antenna elements is weighted in steps, so that the gain given to the power radiated from the eight antenna elements is such that the gain of the power radiated from the antenna elements arranged at the ends of the linear arrangement and having the antenna element numbers 1 and 8 is the smallest, and the gain of the power radiated from the antenna elements arranged at the center of the linear arrangement and having the antenna element numbers 4 and 5 is the largest. Such a weighting is the Chebyshev weighting, and a difference in the weighting is small between the adjacent antenna elements.

FIG. 3C illustrates the output (radiated power) of a main lobe and a side lobe when the power is radiated from the 8 antenna elements of FIG. 3A without the weighting by a dashed line, and the output (radiated power) of the main lobe and the side lobe when the power is radiated from the 8 antenna elements of FIG. 3A with the weighting described above by a solid line. In both the cases without the weighting and with the weighting, one waveform having a largest output at the center represents the output of the main lobe, and three waveforms on both sides of the main lobe represent the output of the side lobe.

When the weighting is reduced from the center towards the ends of the linear arrangement of the 8 antenna elements, the output of the main lobe at the center indicated by the solid line is almost the same as the output of the main lobe at the center for the case without the weighting indicated by the dashed line, as illustrated by the solid line in FIG. 3C. However, the output of the side lobes for the case with the weighting indicated by the solid line is reduced compared to the output of the side lobes for the case without the weighting indicated by the dashed line. Hence, the Chebyshev weighting enables selective reduction of the output of the side lobes, while maintaining the output of the main lobe approximately the same as the output of the main lobe for the case without the Chebyshev weighting.

Figure 4:
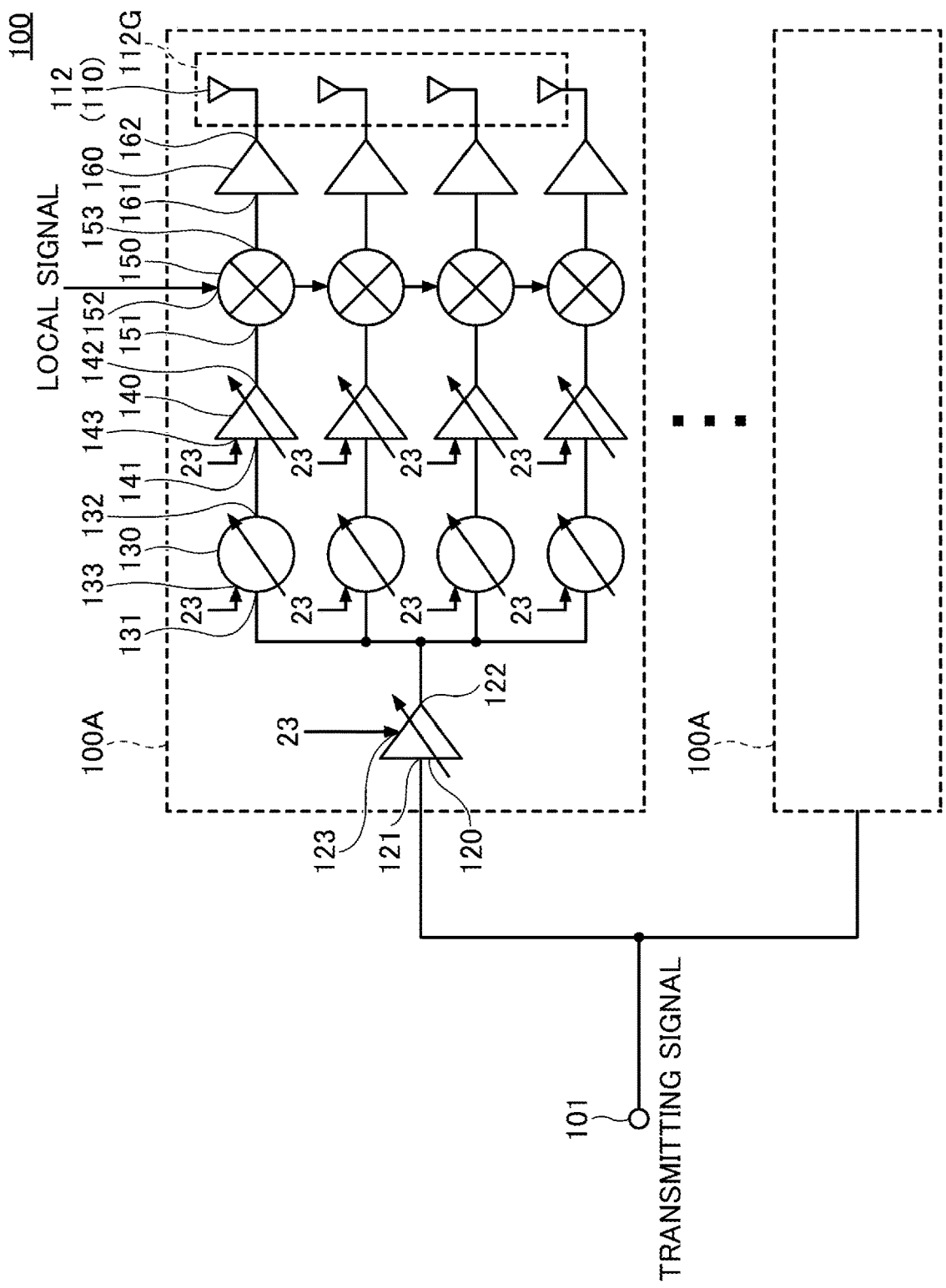
FIG. 4 is a diagram illustrating the wireless communication apparatus.

FIG. 4 is a diagram illustrating the wireless communication apparatus 100. The wireless communication apparatus 100 includes a signal terminal 101, the array antenna 110, an amplifier 120, a phase shifter 130, an amplifier 140, a mixer 150, and a power amplifier (PA) 160. The amplifier 120 is an example of a first variable amplifier, and the amplifier 140 is an example of a second variable amplifier. The signal terminal 101 is connected to the signal output circuit 12 illustrated in FIG. 1, and is an example of an input terminal to which the transmitting signal is input.

FIG. 4 illustrates the antenna elements 112 of the array antenna 110. Although there are 64 antenna elements 112 as illustrated in FIG. 2, FIG. 4 illustrates the configuration related to 4 of the 64 antenna elements 112. The 4 antenna elements 112 illustrated in FIG. 4 are included in one group 112G illustrated in FIG. 2.

As an example, 1 amplifier 120, 4 phase shifters 130, 4 amplifiers 140, 4 mixers 150, and 4 PAs 160 are connected to the 4 antenna elements 112. Because the wireless communication apparatus 100 includes 64 antenna elements 112, the wireless communication apparatus 100 includes 16 amplifiers 120, 64 phase shifters 130, 64 amplifiers 140, 64 mixers 150, and 64 PAs 160.

In this example, the 4 antenna elements 112, the 1 amplifier 120, the 4 phase shifters 130, the 4 amplifiers 140, the 4 mixers 150, and the 4 Pas 160 included in one group 112G, are referred to as a set 100A. Although the wireless communication apparatus 100 includes 16 sets 100A, the configuration of one set 100A will be described because all of the 16 sets 100A have the same configuration. In each set 100A, the 4 phase shifters 130 are connected to an output of the 1 amplifier 120, and 1 amplifier 140, 1 mixer 150, and 1 PA 160 are connected in series to an output of each phase shifter 130.

The amplifier 120 has an input terminal 121 connected to the signal terminal 101, an output terminal 122, and a control terminal 123 connected to the controller 23 illustrated in FIG. 1. The input terminal 121 is an example of a first input terminal, and the output terminal 122 is an example of a first output terminal. The transmitting signal from the signal terminal 101 is input to the input terminal 121, the 4 phase shifters 130 are connected to the output terminal 122. A first weight for the gain, received from the controller 23, is input to the control terminal 123.

The gain of the amplifier 120 is variably controlled according to the first weight for the gain when amplifying the transmitting signal, and the amplifier 120 amplifies the transmitting signal input to the input terminal 121. The amplifier 120 outputs the transmitting signal, input to the input terminal 121, from the output terminal 122 after amplifying the transmitting signal. The first weight is controlled by the controller 23. The first weight is included in the gain weighting data input to the controller 23 from the memory 22.

The gain of amplifier 120, weighted by the first weight, can be controlled in 6 stages in steps (variation width of the gain) of 3 dB in a range of −15 dB to 0 dB, for example. In other words, the gain of the amplifier 120 is controllable to −15 dB, −12 dB, −9 dB, −6 dB, −3 dB, and 0 dB. The range of −15 dB to 0 dB is an example of a range of the first gain. The steps of 3 dB is an example of a first variation width.

The phase shifter 130 includes an input terminal 131, an output terminal 132, and a control terminal 133. Within one set 100A, the output terminal 122 of the amplifier 120 is connected to the input terminals 131 of the 4 phase shifters 130. The 4 output terminals 132 are connected to input terminals 141 of the 4 amplifiers 140, respectively. The control terminals 133 are connected to the controller 23 illustrated in FIG. 1, and the phase weighting data are input to the control terminals 133 of the 4 phase shifters 130. The phase shifter 130 shifts the phase of the transmitting signal (transmitting signal amplified by the amplifier 120) input to the input terminal 131, according to the phase weighting data input to the control terminal 133, and outputs the phase-shifted transmitting signal from the output terminal 132.

The amplifier 140 includes the input terminal 141 connected to the output terminal 132, an output terminal 142, and a control terminal 143 connected to the controller 23 illustrated in FIG. 1. The input terminal 141 is an example of a second input terminal, and the output terminal 142 is an example of a second output terminal. The input terminal 141 receives the phase-shifted transmitting signal from the output terminal 132. An input terminal 151 of the mixer 150 is connected to the output terminal 142. A second weight for the gain, received from the controller 23, is input to the control terminal 143.

The gain of the amplifier 140 is variably controlled according to the second weight for the gain when amplifying the transmitting signal, and the amplifier 140 amplifies the transmitting signal input to the input terminal 141. The amplifier 140 outputs the transmitting signal, input to the input terminal 141, from the output terminal 142 after amplifying the transmitting signal. The second weight is controlled by the controller 23. The second weight is included in the gain weighting data input to the controller 23 from the memory 22.

The gain of amplifier 140, weighted by the second weight, can be controlled in 6 stages in steps (variation width of the gain) of 1 dB in a range of −5 dB to 0 dB, for example. In other words, the gain of the amplifier 140 is controllable to −5 dB, −4 dB, −3 dB, −2 dB, −1 dB, and 0 dB. The range of −5 dB to 0 dB is an example of a range of the second gain, and is narrower than the range of the first gain of the amplifier 120. The steps of 1 dB is an example of a second variation width.

In addition, the range (−5 dB to 0 dB) in which the gain of the amplifier 140 is adjustable is smaller than the range (−15 dB to 0 dB) in which the gain of the amplifier 120 is adjustable, for example. 1 amplifier 140 is provided with respect to each antenna element 112, and this 1 amplifier 120 is provided with respect to 4 antenna elements 112. Because the amplifier 120 has a larger spatial range in which the gain is adjusted in the plan view of the array antenna 110 compared to the amplifier 140, the adjustable range of the gain of the amplifier 120 is set larger than the adjustable range of the gain of the amplifier 140, for example. If the adjustable range of the gain of the amplifier 120 does not need to be larger than the adjustable range of the gain of the amplifier 140, the adjustable range of the gain of the amplifier 120 may be set smaller than or equal to the adjustable range of the gain of the amplifier 140.

The mixer 150 includes input terminals 151 and 152, and an output terminal 153. The input terminal 151 is connected to the output terminal 142 of the amplifier 140, and the amplified transmitting signal from the amplifier 140 is input to the input terminal 151. The input terminal 152 is connected to the signal output circuit 13 of the base station 10, and the local signal is input to the input terminal 152. The output terminal 153 is connected to an input terminal 161 of the PA 160. The mixer 150 multiplies the transmitting signal input to the input terminal 151 by the local signal input to the input terminal 152, and outputs a multiplied signal from the output terminal 153.

The PA 160 is a power amplifier including an input terminal 161, and an output terminal 162. The input terminal 161 is connected to the output terminal 153 of the mixer 150, and the output terminal 162 is connected to the antenna element 112. The PA 160 amplifies the signal input from mixer 150, and outputs the amplified signal to the antenna element 112. An amplification factor of PA 160 is constant.

The wireless communication apparatus 100 having the configuration described above outputs the plurality of beams from the array antenna 110, for example. Because each beam includes the main lobe and the side lobes, and has a unique beam ID, interference between the main lobe of each beam and the side lobes of other beams needs to be reduced. In order to reduce the interference between the beams, the gain of the signal emitted from each antenna element 112 needs to be adjusted. The gain of the signal emitted from each antenna element 112 needs to be adjusted for each antenna element 112 in the group 112G by the amplifier 140, in addition to being adjusted for each group 112G by the amplifier 120.

Figure 5B:
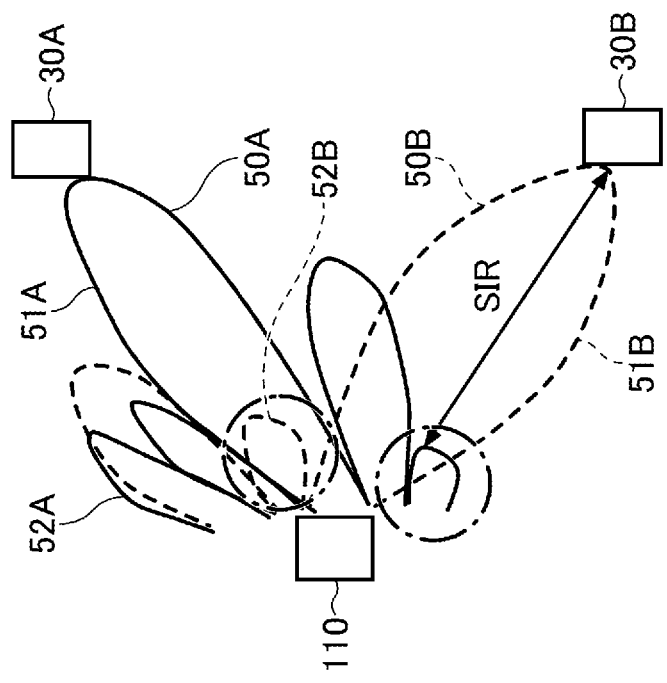
FIG. 5A and FIG. 5B are diagrams illustrating two beams.
Figure 5A:
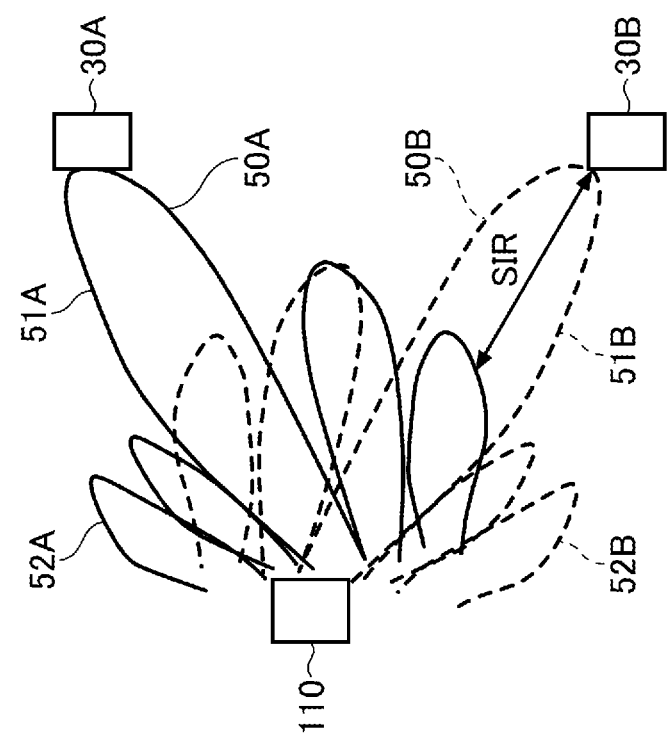

FIG. 5A and FIG. 5B illustrate two beams 50A and 50B. In this example, a beam 50A is indicated by a solid line, and a beam 50B is indicated by a dashed line. For the sake of convenience, FIG. 5A and FIG. 5B indicate a magnitude of each signal to interference ratio (SIR: a ratio of a signal power and an interfering power) by a length of each double-headed arrow. Terminals 30A and 30B may be smartphones or the like, for example.

The beam 50A includes 1 main lobe 51A, and a plurality of side lobes 52A. The beam 50B includes 1 main lobe 51B, and a plurality of side lobes 52B. The main lobe 51A is output from the array antenna 110 toward the terminal 30A, and the main lobe 51B is output from the array antenna 110 toward the terminal 30B. FIG. 5A illustrates a state where the weighting data are not utilized and the output of the side lobes 52A and 52B is not reduced, for comparison purposes. FIG. 5B illustrates a state where the weighting data are utilized and the output of the side lobes 52A and 52B is reduced.

In FIG. 5A, the main lobe 51A of the beam 50A and the side lobes 52B of the beam 50B overlap, and the output of the side lobes 52B is large to a certain extent. Similarly, the main lobe 51B of the beam 50B and the side lobes 52A of the beam 50A overlap, and the output of the side lobes 52A is large to a certain extent. In this state, the interference between the main lobe 51A and the side lobes 52B is large, and the SIR between the main lobe 51A and the side lobes 52B is small. Similarly, the interference between the main lobe 51B and the side lobes 52A is large, and the SIR between the main lobe 51B of the beam 50B and the side lobes 52A of the beam 50A is small. When the SIR is small, the communication state is not good because of a throughput of the communication deteriorates.

On the other hand, in FIG. 5B, when compared to FIG. 5A, the outputs of the side lobes 52A and 52B overlapping the main lobes 51A and 51B are reduced, as illustrated inside circles indicated by a one-dot chain line. For this reason, the interference between the main lobe 51A and the side lobes 52B is small, and the SIR between the main lobe 51A and the side lobes 52B is large. Similarly, the interference between the main lobe 51B and the side lobes 52A is small, and the SIR between the main lobe 51B and the side lobes 52A is large. When the SIR is large, a good communication state can be obtained because the throughput of the communication improves.

As illustrated in FIG. 5B, the outputs of the side lobes 52A and 52B overlapping the main lobes 51A and 51B can be reduced by adjusting the first weight of the 16 amplifiers 120, adjusting the second weight of the 64 amplifiers 140, and individually adjusting the gains of the signals output from the antenna elements 112.

Accordingly, it is possible to individually adjust the gains of the signals output from the antenna elements 112, by connecting 1 amplifier (variable gain amplifier) having the weight of the gain variable in steps of 1 dB in a range of −20 dB to 0 dB, to each antenna element 112, so as to adjust the weight of the gain of all of the amplifiers connected to the antenna elements 112, for example. In other words, the gains of the signals output from the antenna elements 112 can be adjusted by connecting 64 amplifiers (variable gain amplifiers), having the weights of the gains variable in steps of 1 dB in a range of −20 dB to 0 dB, to 64 antenna elements 112, respectively, and adjusting the 64 weights input to the 64 amplifiers. It is known that reducing the output of the side lobes by the weighting described above can also be achieved by the Chebyshev weighting.

However, an amplifier, having a weight of the gain thereof variable in steps of 1 dB in a range of −20 dB to 0 dB, needs to set the gain in multiple stages, and a size of the amplifier becomes large, thereby increasing the size of the wireless communication apparatus. In addition, the weighting data for adjusting the weight of the gain in steps of 1 dB in the range of −20 dB to 0 dB greatly increases the amount of data. Moreover, because the closer the amplifier is to the antenna element 112, the larger the signal output becomes, it is difficult to provide, within a limited space, 64 high-performance amplifiers having the weights of the gains variable in steps of 1 dB in the range of −20 dB to 0 dB.

On the other hand, according to the wireless communication apparatus 100, the amplifiers can be arranged with ease by employing a 2-stage configuration including the 16 amplifiers 120 and the 64 amplifiers 140. Further, the amplifiers 120 close to the signal terminal 101 are arranged so that, within one group 112G, 1 amplifier 120 is provided with respect to the 4 amplifiers 140 connected to the 4 antenna elements 112 of the same group 112G, respectively. It is conceivable to employ an arrangement in which 64 amplifiers 120 are connected to the 64 amplifiers 140, respectively, however, the circuit scale of the wireless communication apparatus cannot be reduced by such a conceivable arrangement.

When adjusting the gains of the signals output from the 64 antenna elements 112, the gains of the signals output from the antenna elements 112 arranged close to each other have relatively close values. For example, among the 64 antenna elements 112, the gains of the signals output from the antenna elements 112 positioned at the end along a +X direction and the end along a +Y direction may greatly differ from the gains of the signals output from antenna elements 112 positioned at the end along a −X direction and the end along a −Y direction. In contrast, among the 64 antenna elements 112, the gains of the signals output from some of the antenna elements 112 adjacent to each other have relatively close values, as is evident from FIG. 3C illustrating the example of the Chebyshev weighting. As illustrated in FIG. 3B, the weighting gradually varies from the antenna element having the antenna element number 1 to the antenna element having the antenna element number 8. In other words, the difference between the weights of the adjacent antenna elements is small.

For this reason, the wireless communication apparatus 100 employs a configuration in which the 4 antenna elements 112, made up of the array of 2×2 antenna elements 112, are regarded as one group 112G, and 1 amplifier 120 is provided with respect to each group 112G, to roughly adjust the gain, and further, 1 amplifier 140 is connected to each of the antenna elements 112 to individually adjust the gains of the antenna elements 112. This configuration can reduce the number of amplifiers 120 positioned near the signal terminal 101, and thus reduce the circuit scale of the wireless communication apparatus 100.

Accordingly, it is possible to provide the wireless communication apparatus 100 having a reduced circuit scale. In addition, because the number of amplifiers 120 can be reduced, the amount of weighting data can be reduced, and the size (or storage capacity) of the memory 22 can be reduced. For example, in a wireless communication apparatus having 64 amplifiers having the weight of the gain variable in steps of 1 dB in a range of −20 dB to 0 dB, the amount of weighting data required becomes 20 dB×64=1280 dB. On the other hand, in the wireless communication apparatus 100, the size (or storage capacity) of the memory 22 can be reduced, because the amount of weighting data required is only 15 dB/3 dB (steps)×16+5 dB/1 dB (steps)×64=400 dB.

Moreover, because the gain of the amplifier 120 is adjustable in a range of −15 dB to 0 dB, and the gain of the amplifier 140 is adjustable in a range of −5 dB to 0 dB, the gain can be adjusted in a range of −20 dB to 0 dB by a 2-stage adjustment enabled by the 2-stage configuration. Thus, the transmitting signal can be amplified with a gain in the same range as when using 64 amplifiers having the gain adjustable in the range of −20 dB to 0 dB.

The amplifier 140 positioned close to the antenna element 112 can adjust the gain in steps of 1 dB, and the amplifier 120 positioned close to the signal terminal 101 can adjust the gain in steps of 3 dB. Thus, by employing the configuration in which the amplifier 120 adjusts the gain in steps coarser than the gain adjusting steps of the amplifier 140, the circuit scale of the amplifier 120 can be reduced, thereby enabling the circuit scale of the wireless communication apparatus 100 to be reduced.

Further, by making the gain of the amplifier 140 adjustable in a range smaller than the gain adjustable range of the amplifier 120, the circuit scale of the amplifier 140 can be reduced, thereby enabling the circuit scale of the wireless communication apparatus 100 to be reduced.

The number of amplifiers 120 is preferably 3 or more. An example will be described under a precondition that the gains of the signals output from M antenna elements 112 are adjusted in a range of −20 dB to 0 dB, where M is an integer greater than or equal to 10. Further, it is assumed that the range of −20 dB to 0 dB of the gain of the signals output from the M antenna element 112 is divided into the range of −15 dB to 0 dB of amplifiers 120, and the range of −5 dB to 0 dB of M amplifiers 140, to form 2 beams by the signals output from the M antenna elements 112. When outputting the two beams in mutually different directions, gain data indicating the gains with which the signals output from the M antenna elements 112 are amplified, respectively, are determined. It is assumed that a minimum value and a maximum value of the gains of the signals output from the M antenna elements 112 indicated by the gain data are −20 dB and 0 dB, respectively.

First, if 1 amplifier 120 is provided, the signals output from the 64 antenna elements 112 are uniformly amplified with one of the gains within the range of −15 dB to 0 dB, and it is not possible to cope with the gain data. For this reason, it may be seen that a plurality of amplifiers 120 are required. In addition, if 2 amplifiers 120 are provided, both the 2 amplifiers 120 will likely be connected to the antenna element 112 which outputs the signal amplified with the minimum gain or the maximum gain, and it is extremely difficult to cope with the gain data. But if 3 amplifiers 120 are provided, one of the 3 amplifiers 120 will likely be not connected to the antenna element 112 which outputs the signal amplified with the minimum gain or the maximum gain, and it is more likely possible to cope with the gain data. For this reason, the number of amplifiers 120 is preferably 3 or more.

Further, because 64 antenna elements 112 are divided into 16 groups 112G, and the 16 groups 112G are symmetrically arranged in the plan view, the gains can be coarsely adjusted by the 16 amplifiers 120 connected to the 16 groups 112G, respectively, and the gains can be individually adjusted by the 4 amplifiers 140 connected to the 4 antenna elements 112 included in each of the 16 groups 112G. Hence, similar to when the gains are adjusted by connecting 64 amplifiers to 64 antenna elements, respectively, it is possible to adjust the gains by using the 16 amplifiers 120 and the 64 amplifiers 140. In other words, the circuit scale can be reduced without sacrificing the adjustability of the gain.

Because the 4 antenna elements 112 included in each group 112G are arranged adjacent to each other in the plan view, it is possible to freely adjust the gains of the signals output from all the antenna elements 112 by the coarse gain adjustment by the amplifiers 120 and the individual gain adjustment by the amplifiers 140.

In the example described above, one group 112G includes the 4 antenna elements 112 (N=4) arranged adjacent to each other in the array of 2×2 antenna elements 112. However, the plurality of antenna elements 112 included in one group 112G need only be adjacent to each other, and the arrangement of the antenna elements 112 in one group 112G is not limited to the array of 2×2 antenna elements 112. Further, although N may be greater than or equal to 2, if N is greater than or equal to 3, the plurality of antenna elements 112 are preferably arranged two-dimensionally in the plan view, than being arranged linearly in the plan view. In other words, if N=3, the 3 antenna elements 112 are preferably arranged at positions corresponding to 3 vertices of a triangle, because the 3 antenna elements 112 arranged at the positions corresponding to the 3 vertices of the triangle will be closer to each other compared to 3 antenna elements 112 arranged linearly. The arrangement of the 4 antenna elements 112 is not limited to the array of 2×2 antenna elements 112 illustrated in FIG. 2, and the 4 antenna elements 112 may be arranged at positions corresponding to 4 vertices of a rhombus, for example. Further, N may be greater than or equal to 5.

Moreover, in the example described above, the wireless communication apparatus 100 includes the 64 antenna elements 112 arranged in the array of 8×8 antenna elements 112, however, the number and arrangement of the antenna elements 112 in the wireless communication apparatus 100 are not limited to those described above.

Although the wireless communication apparatus 100 described above has a configuration including 16 amplifiers 120, the number of amplifiers 120 is not limited to 16, and 8 amplifiers 120 may be provided with respect to 64 antenna elements 112, or 32 amplifiers 120 may be provided with respect to 64 antenna elements 112, for example.

In addition, although the number of antenna elements 112 and the number of amplifiers 140 are the same in the example described above, a plurality of antenna elements 112 may be connected to 1 amplifier 140. For example, 2 antenna elements 112 may be connected to the PA 160 illustrated in FIG. 4.

The wireless communication apparatus 100 described above has the two-stage configuration formed by the amplifiers 120 and the amplifiers 140. However, a number of variable gain amplifiers, smaller than the number of amplifiers 120, may be provided between the signal terminal 101 and the amplifiers 120. Moreover, a number of variable gain amplifiers, larger than the number of amplifiers 120 and smaller than the number of amplifiers 140, may also be provided between the amplifiers 120 and the amplifiers 140.

In the example described above, the amplifier 140, provided closer to the antenna element 112 than the amplifier 120, can adjust the gain in steps of 1 dB, and the amplifier 120, provided closer to the signal terminal 101 than the amplifier 140, can adjust the gain in steps of 3 dB. However, the steps with which the amplifier 120 adjusts the gain is not limited to 3 dB. The steps with which the amplifier 140 adjusts the gain may be the same as the steps with which the amplifier 120 adjusts the gain.

Further, in the example described above, the gain adjustable range of −5 dB to 0 dB of the amplifier 140 is smaller than the gain adjustable range of −15 dB to 0 dB of the amplifier 120. However, the gain adjustable range of the amplifier 140 may be the same as the gain adjustable range of the amplifier 120, and the gain adjustable range of the amplifier 140 may be larger than the gain adjustable range of the amplifier 120.

Although the wireless communication apparatus 100 described above has a configuration which does not include the controller 23, the memory 22, and the decoder 21, the wireless communication apparatus 100 may include the controller 23, the memory 22, and the decoder 21.

According to each of the embodiments and modifications described above, it is possible to provide a wireless communication apparatus which can reduce the circuit scale thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
    a signal terminal configured to receive a transmitting signal;
    N antenna elements, where N is an integer greater than or equal to two;
    a first variable amplifier including a first input terminal coupled to the signal terminal, and a first output terminal; and
    N second variable amplifiers including N second input terminals, and N second output terminals coupled to the N antenna elements, respectively, wherein
    all of the N second input terminals are coupled in common to the first output terminal,
    the first variable amplifier is configured to amplify the transmitting signal received from the signal terminal via the first input terminal with a gain which is weighted and adjustable according to a first weight, and output the amplified transmitting signal via the first output terminal, and
    the N second variable amplifiers are configured to amplify the amplified transmitting signal received from the first output terminal via the N second input terminals with gains which are weighted and adjustable according to N second weights, and output amplified transmitting signals respectively amplified by the N second variable amplifiers, to the N antenna elements via the N second output terminals, respectively.

2. The wireless communication apparatus as claimed in claim 1, wherein
    the first variable amplifier variably amplifies the gain of the transmitting signal received via the first input terminal with a first variation width within a first range of the gain according to the first weight, and
    the N second variable amplifiers variably amplify the gains of the amplified transmitting signal received via the N second input terminals with a second variation width within a second range of the gains according to the N second weights, respectively.

3. The wireless communication apparatus as claimed in claim 2, wherein the first variation width is larger than the second variation width.

4. The wireless communication apparatus as claimed in claim 2, wherein the second range is narrower than the first range.

5. The wireless communication apparatus as claimed in claim 1, further comprising:
    a plurality of sets,
    wherein each of the plurality of sets includes the first variable amplifier, the N second variable amplifiers, and the N antenna elements, and
    wherein the N antenna elements of each of the plurality of sets form an array antenna.

6. The wireless communication apparatus as claimed in claim 5, wherein each of the plurality of sets includes three or more first variable amplifiers.

7. The wireless communication apparatus as claimed in claim 5, wherein
    all of the antenna elements included in the plurality of sets of the array antenna are divided into a plurality of groups, so that each of the plurality of groups includes the N antenna elements of each of the plurality of sets, and
    all of the antenna elements included in the plurality of sets are arranged symmetrically in a plan view for each of the plurality of groups.

8. The wireless communication apparatus as claimed in claim 7, wherein the N antenna elements of each of the plurality of sets are arranged adjacent to each other in the plan view.

9. The wireless communication apparatus as claimed in claim 1, further comprising:
    N phase shifters coupled between the first output terminal and the N second input terminals, respectively;
    N mixers having inputs thereof coupled to the N second output terminals, respectively; and
    N power amplifiers coupled between outputs of the N mixers and the N antenna elements, respectively.

10. The wireless communication apparatus as claimed in claim 9, further comprising:
    a plurality of sets,
    wherein each of the plurality of sets includes the first variable amplifier, the N phase shifters, the N second variable amplifiers, the N mixers, the N power amplifiers, and the N antenna elements, and
    wherein the N antenna elements of each of the plurality of sets form an array antenna.

11. The wireless communication apparatus as claimed in claim 10, wherein N is greater than or equal to four.

12. The wireless communication apparatus as claimed in claim 9, further comprising:

a decoder configured to decode an input ID number to acquire an address;

a memory, including a memory controller, configured to read control data therefrom based on the address input from the decoder, the control data including gain weighting data for weighting a gain when amplifying the transmitting signal, and phase weighting data for weighting a phase when shifting the phase of the transmitting signal; and a controller configured to control an amplification and a phase shift of the transmitting signal input to the signal terminal, by supplying the gain weighting data from the memory to the first variable amplifier, and supplying the phase weighting data from the memory to the N phase shifters.

13. The wireless communication apparatus as claimed in claim 1, wherein the first variable amplifier adjusts the gain in steps coarser than steps with which the N second variable amplifiers adjust the gains.

* * * * *